April 28, 1964   B. P. BAER ETAL   3,130,806
HYDRAULIC STEERING MECHANISM FOR ARTICULATED VEHICLES
Filed May 31, 1962   3 Sheets-Sheet 1

INVENTORS.
BENJAMIN P. BAER
BY CHARLES H. HERR, JR.
Fryer and Zimmold
ATTORNEYS

INVENTORS.
BENJAMIN P. BAER
BY CHARLES H. HERR, JR.
Fryer and Zimvold
ATTORNEYS

United States Patent Office 3,130,806
Patented Apr. 28, 1964

3,130,806
HYDRAULIC STEERING MECHANISM FOR ARTICULATED VEHICLES
Benjamin P. Baer, Washington, and Charles H. Herr, Jr., Peoria, Ill., assignors to Caterpillar Tractor Co., Peoria, Ill., a corporation of California
Filed May 31, 1962, Ser. No. 199,155
2 Claims. (Cl. 180—79.2)

This invention relates to hydraulic steering mechanism for articulated vehicles and particularly to means for preventing damage to the vehicle and steering components thereof which might result from oversteering, either through the steering mechanism or through external forces which would tend to jack-knife the vehicle and impose excessive loads on certain portions of the steering linkage.

In articulated vehicles having a forward wheel supported frame pivotally connected with a rearward wheel supported frame, it is common practice to steer with one or more hydraulic jacks connected between the frames in a manner to cause them to pivot relative to each other. In heavy earthmoving equipment such vehicles often encounter obstructions which cause the articulated sections to pivot or jack-knife relative to each other without respect to the position of the steering linkage, thus imposing excessive and damaging forces on the linkage.

The extreme limit of pivotal movement between articulated sections of such a vehicle occurs when the frame or some part of one section abuts some part of the other section. In some cases, this abutment serves in itself to limit steering and suitable stops or pads are provided to protect the vehicle parts against damage.

However, this contact between the vehicle sections can in some instances occur with considerable force and the impact is sufficient to cause damage not only to the steering mechanism, but also to other components of the vehicle.

It is therefore the object of the present invention to provide a hydraulic steering mechanism for articulated vehicles which will insure against damage resulting from external forces tending to steer or jack-knife the vehicle and will also insure against damage resulting from oversteering through the steering mechanism itself.

Further objects and advantages of the invention are made apparent in the following specification wherein reference is made to the accompanying drawings disclosing a preferred form of the invention.

Figure 1:
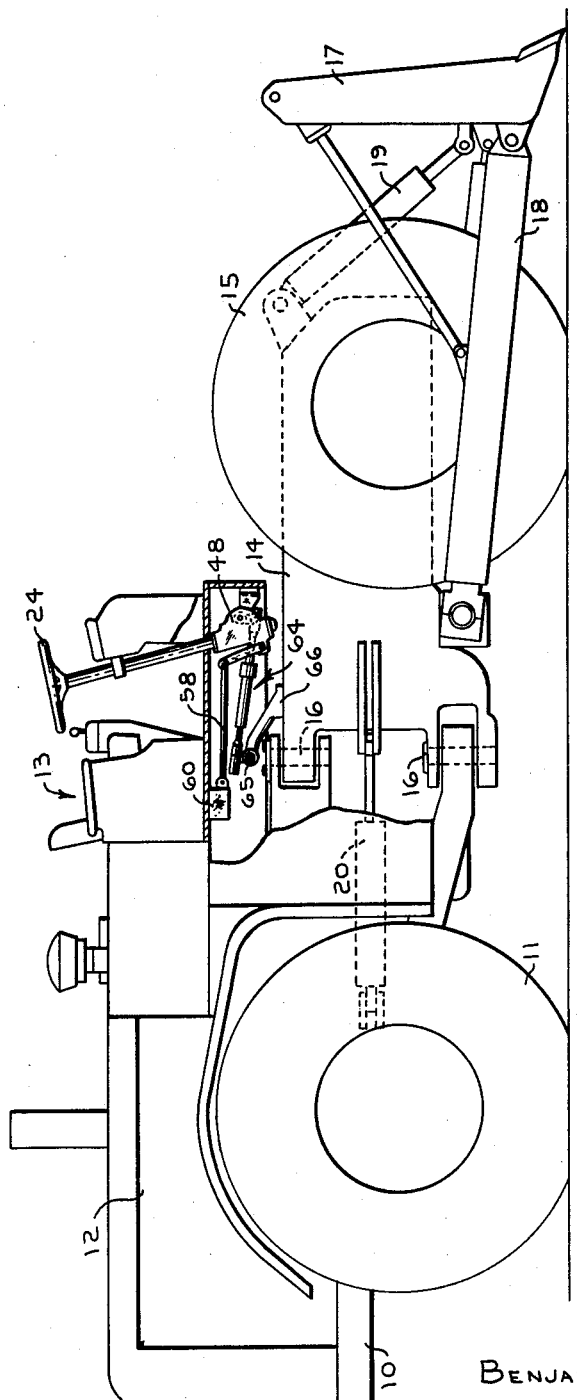
FIG. 1 is a view in side elevation of an articulated tractor with a bulldozer thereon, employing a steering mechanism of the present invention.
Figure 2:
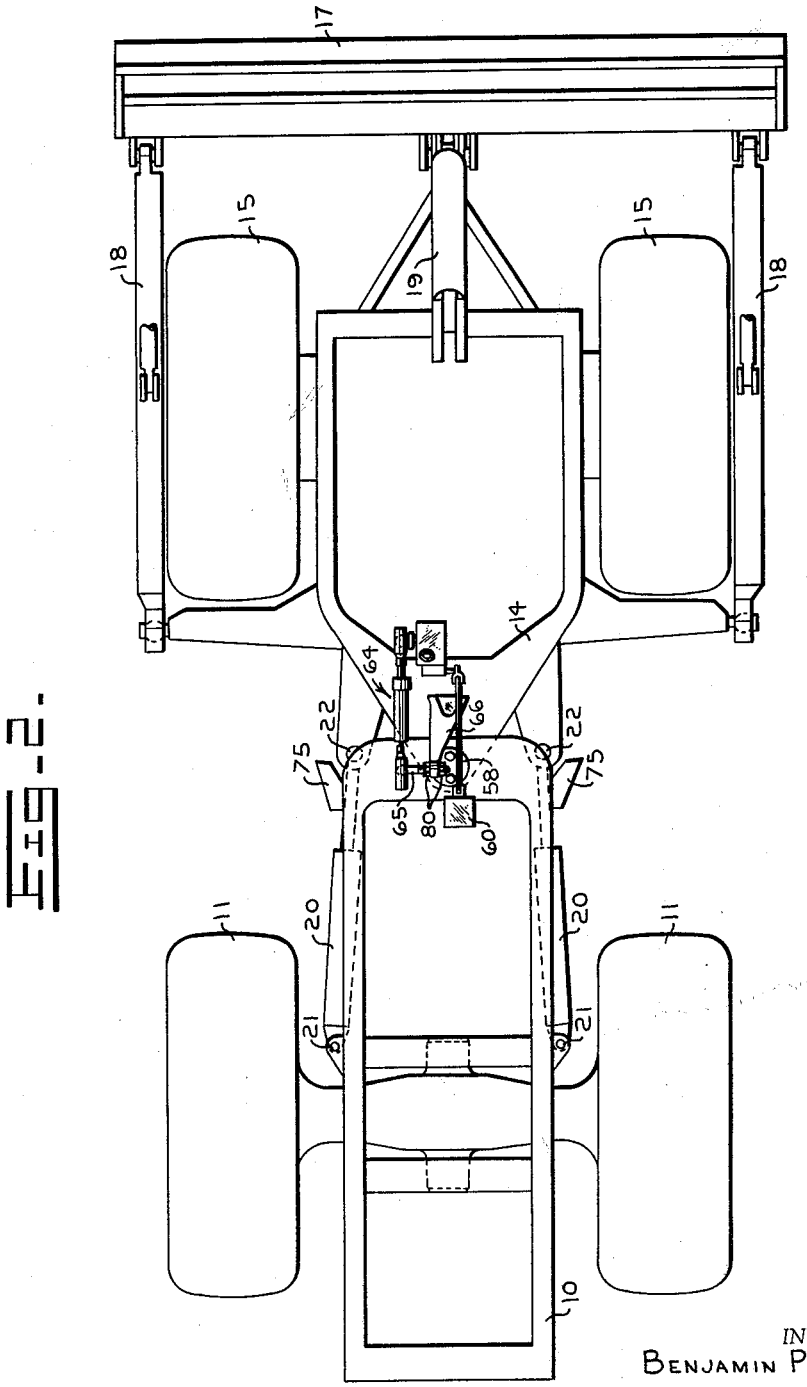
FIG. 2 is a plan view of the articulated frame sections of the same tractor with the engine and driver's station removed to better disclose certain features of the steering mechanism.

Referring first to FIGS. 1 and 2 a tractor is disclosed which has a rear frame 10 supported on wheels 11 and carrying an engine compartment 12 and a forwardly extending operator's station 13. A forward frame 14 supported on wheels 15 is pivotally connected to the rear frame 10 as by a pair of vertically aligned pivot pins 16. In the present instance, the front frame is also shown as supporting a bulldozer blade 17 on push arms 18 with a conventional hydraulic jack 19 which controls the height of the blade.

Conventional steering means include a pair of hydraulic jacks 20, each of which is pivotally connected to the rear frame as at 21 and to the front frame as at 22. With this arrangement, extension of one jack and retraction of the other obviously causes pivotal movement of the frames 10 and 14 about their connecting pins 16, and therefore results in steering of the articulated vehicle. This steering is accomplished through a steering wheel 24 at the operator's station through a system which is basically old and disclosed, for example, in U.S. Patent 2,614,644 to Gustafson and 2,846,848 to Coker. This system will be briefly described herein to facilitate an understanding of the improvements thereto which constitute the present invention.

Figure 3:
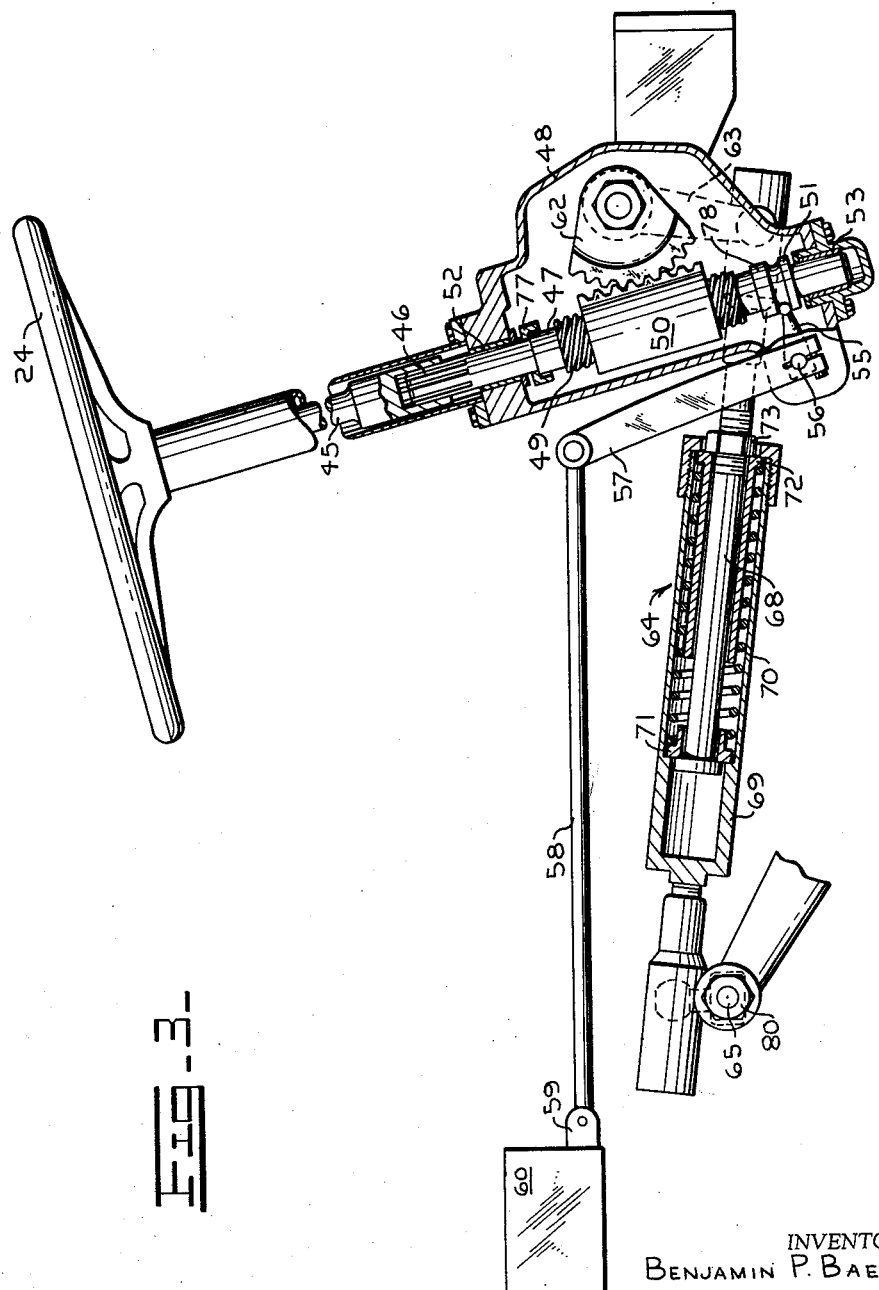
FIG. 3 is an enlarged detail in side elevation with parts shown in the section of those portions of the steering mechanism which include the present invention.

Referring first to FIG. 3, the wheel 24 is shown as supported on a rotatable spindle 45 connected as by a spline 46 or other extensible means to a steering column 47 rotatable in a housing 48 which, as shown in FIG. 1, is carried by the forwardly extending portion of the rear frame 10 which supports the operator's station. A threaded portion 49 on the steering column 47 extends through an interiorly threaded nut 50 and has adjacent its lower end, a grooved collar 51. With this arrangement, turning movement of the steering wheel 24 advances the column 47 in one direction or the other through the nut 50, the column being supported for such advancing movement in bearings 52 and 53. A lever arm 55 on a shaft 56 terminates in the groove of the collar 51 so that reciprocal movement of the column 47 rocks the shaft 56 and a lever 57 also connected thereto. The lever 57 is connected by a link 58 with the spool 59 of a valve 60. The valve 60 may be of a well known type such, for example, as those disclosed in the patents referred to above. Movement of the spool in one direction directs hydraulic fluid to the jacks 20 to extend one jack and retract the other. Upon movement of the spool in the opposite direction, the opposite jack is extended while the other is retracted to provide for steering in either direction.

It is common practice in steering mechanisms of this kind to prevent continuous steering upon slight turning of the steering wheel by employing follow-up linkage, the function of which is to return the steering column and control valve 60 to normal positions each time that turning movement of the steering wheel is discontinued. Such follow-up linkage comprises a segment gear shown at 62 in FIG. 3 meshing with rack teeth formed externally of the nut 50. A lever 63 fixed to the same shaft and rotatable with the segment gear 62 is connected as by a link generally indicated at 64 (see also FIGS. 1 and 2) with a pin 65 fixed to a bracket 66 carried by the forward frame 14 and having its end disposed above the pivot pins 16 which connect the articulated frames. Consequently, the end of the bracket 66 and the pin 65 describe an arc upon pivotal movement of the frames resulting from steering. This movement, through the link 64, rotates the segment 62 in a direction depending on the direction of steering to move the nut 50 of the shaft 47 back to normal position when turning movement of the steering wheel stops. This return of the steering column 47 to normal affects the return of the valve 60 to normal and discontinues supply of steering fluid to the jacks.

The follow-up linkage just described is not, during ordinary steering operations, subjected to forces of high magnitude. However, in the event of jack-knifing or steering due to external forces, it may be subjected to destructive forces. For example, should one end of the bulldozer blade 17 encounter a relatively immovable object such as a large rock or tree root, the rear frame of the vehicle powered by the vehicle engine may tend to overtake the forward frame and jack-knife with respect thereto with the steering mechanism and follow-up mechanism in a fixed position. To prevent resulting damage to these mechanisms when they are subjected to such an external steering force, the link 64, is, as shown in FIG. 3, made collapsible or extensible. To this end the link is composed of a rod 68 telescopically mounted in a cylinder 69. The entire link is normally held at a fixed length by a spring 70 bearing between a seat 71 on the rod and a seat 72 which embraces the rod. The seat 71 bears on a shoulder within the cylinder 69 and the seat 72 bears against a nut 73 on the rod 68, consequently upon application of forces in excess of those required for proper functioning of the follow-up mechanism, extension of the link 64 is permitted by the compression of the spring 70 as the rod is withdrawn from the cylinder and compression of the link is permitted by compression of the spring 70 as the rod is forced inwardly of the cylinder and the destructive forces are absorbed by the spring.

As best shown in FIG. 2 relative pivotal movement of the frames is limited as by a pair of stops 75 fixed with respect to the rear frame and adapted to engage the forward frame. Since it is undesirable to limit steering movement by such stops during conventional steering, the present invention provides means for discontinuing flow of fluid to the steering jacks just prior to engagement of the stops with the forward frame. This means, best shown in FIG. 3, comprises a collar 77 fixed on the steering column 47 above the nut 50 and an enlargement 78 on the grooved collar 51 below the nut 50. These collars limit travel of the nut 50 under the influence of the follow-up linkage, previously described, so that the nut will stop and prevent further turning of the steering wheel 24 in either direction prior to engagement of the nut against the housing 48. Thus, it is possible for the follow-up mechanism to return the steering column to its neutral position after the nut has come to rest and it is no longer possible to effect steering by turning of the steering wheel. Without the stop collars 77 and 78 steering pressure will continue to be directed to the jacks when the nut 50 abuts the end wall of the housing. In this condition the steering wheel cannot be turned farther and the follow-up linkage cannot move the nut and steering column axially.

To insure maximum possible steering without abutment of the stops 75 of FIG. 2 against the forward frame and to compensate for manufacturing tolerances, the pin 65 is adjustably connected to the end of a bracket 66 and secured in its adjusted position as by nuts shown at 80. Since the length of the pin 65 will determine the magnitude of movement of the follow-up mechanism, this adjustment may be employed to correlate the mechanism employed to stop steering by means of the steering wheel 24 with the position of the stops 75 relative to the forward frame.

We claim:

1. In hydraulic steering mechanism for an articulated vehicle in which steering moves the articulated sections of the vehicle toward contact with each other, and having manually actuated steering means for controlling fluid flow to steering motors, and follow-up linkage to prevent such flow when the steering means comes to rest, the improvement which comprises means associated with the follow-up linkage to limit actuation of the steering means to positions which prevent such contact between the articulated sections, and an adjustable element in the follow-up linkage for accurately correlating said positions.

2. The combination set forth in claim 1 in which the follow-up linkage includes a nut threaded on a reciprocable steering column to effect axial advancement of the column upon turning thereof, means responsive to articulation of the vehicle sections to move the nut and column axially to a non-steering position and stop means to limit turning of the column with respect to the nut while the nut and column are movable axially in response to said articulation.

References Cited in the file of this patent

UNITED STATES PATENTS

| | | |
|---|---|---|
| 2,614,644 | Gustafson | Oct. 21, 1952 |
| 2,885,022 | Rockwell | May 5, 1959 |
| 2,896,734 | Toth | July 28, 1959 |
| 3,049,187 | Medley et al. | Aug. 14, 1962 |